United States Patent [19]
Blattner et al.

[11] Patent Number: 5,971,131
[45] Date of Patent: Oct. 26, 1999

[54] METHOD OF CONVEYING ARTICLES HANGING ON HANGERS AND DEVICES FOR USE IN THE METHOD

[75] Inventors: Thomas Blattner, Bielefeld; Thomas Diekmann, Bad Salzuflen; Siegfried Goldbeck, Gütersloh; Paul Janzen, Bielfeld; Frank Kuhnt, Bielefeld; Martin Lüke, Schloss Holte; Dirk Kuhlemann, Bielefeld; Uwe Petermeier, Steinhagen; Thomas Zahn, Bielefeld; Klaus Niesen, Bielefeld, all of Germany

[73] Assignee: Dürkopp Adler AG, Germany

[21] Appl. No.: 08/722,454

[22] Filed: Sep. 27, 1996

[30] Foreign Application Priority Data

Sep. 29, 1995 [DE] Germany .............. 195 36 313

[51] Int. Cl.⁶ ............................................. B65G 37/00
[52] U.S. Cl. .............. 198/357; 198/502.2; 198/349.95
[58] Field of Search ........................... 198/357, 502.2, 198/349.95, 349

[56] References Cited

U.S. PATENT DOCUMENTS

| | | | |
|---|---|---|---|
| 3,105,601 | 10/1963 | Smoll | 198/349.95 |
| 3,563,395 | 2/1971 | Gary | 198/349.95 |
| 3,955,678 | 5/1976 | Moyer | 209/564 |
| 4,212,384 | 7/1980 | Grube | 198/684 |
| 4,903,819 | 2/1990 | Heinold et al. | 198/465.4 |

FOREIGN PATENT DOCUMENTS

| | | |
|---|---|---|
| 4003431 | 8/1991 | Germany . |
| 9017548 | 6/1992 | Germany . |
| 4244219 | 6/1994 | Germany . |
| 9402990 | 8/1995 | Germany . |
| 1399075 | 6/1975 | United Kingdom . |

Primary Examiner—Joseph E. Valenza
Assistant Examiner—Kenneth W. Bower

[57] ABSTRACT

A method and apparatus for conveying material hanging on hangers. The material is transported from a loading region to a conveyance region, and then to a delivery region. Grip units of various lengths are formed by combining individual materials into groups. A theoretical maximum length for a grip unit is established. Clock pulses are produced in the conveyance region and are counted. Grip units stowed in the loading region are individualized to form well-defined spaces between the materials. Individualized grip units fed to the conveyance region are switched into the conveyance region when a gap sufficiently large to accommodate the grip unit is present in the conveyance region, determined by the maximum length established and counting of the clock pulses. The distance to be moved by the grip unit in the conveyance region to reach its destination is established, and progress of the grip unit is tracked. The grip unit is switched out to the delivery region, the switch-out mechanism remaining in effect to accommodate the length of the grip unit.

9 Claims, 10 Drawing Sheets

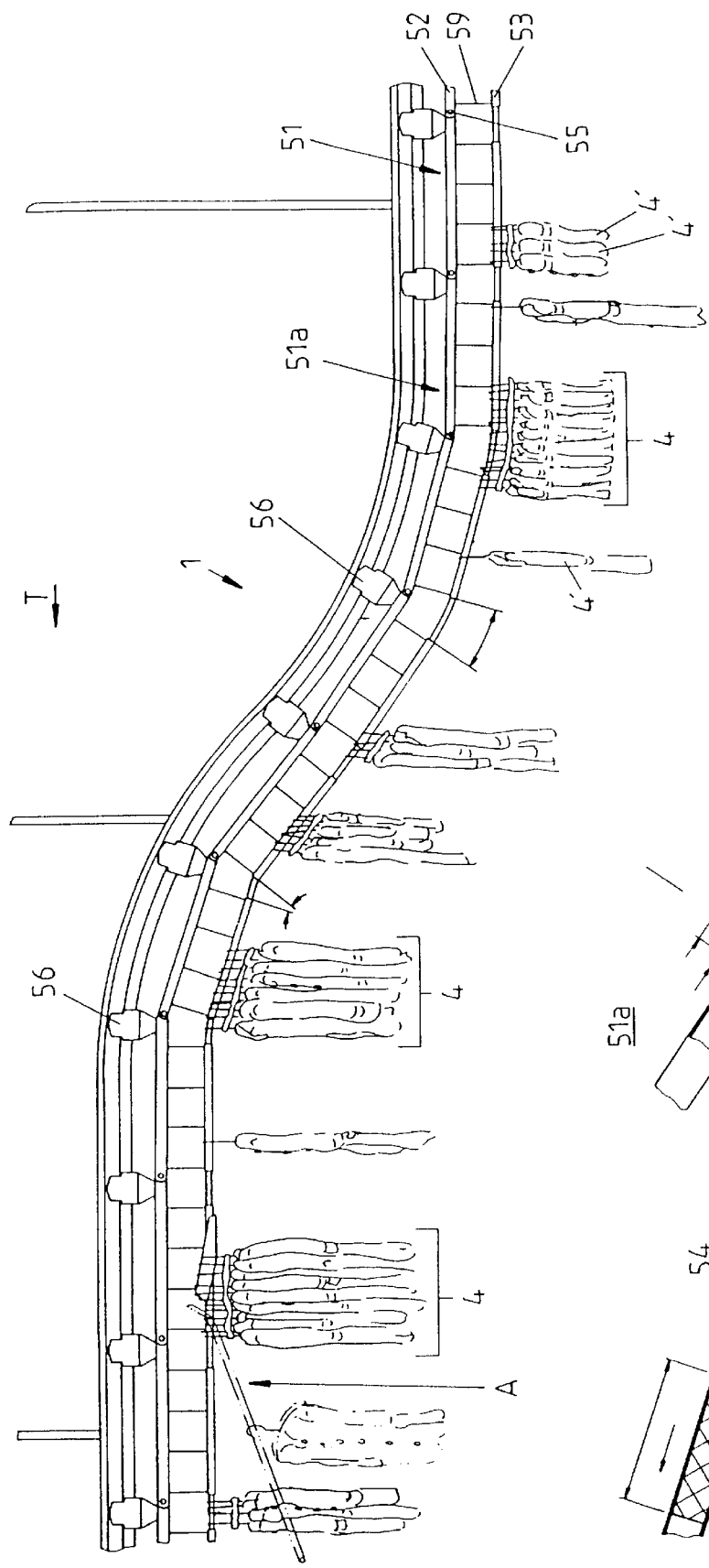

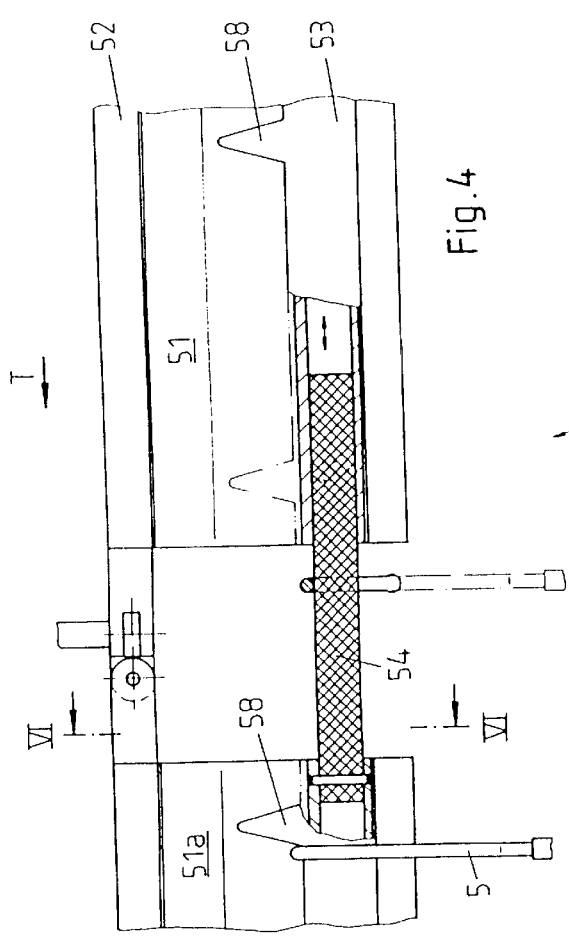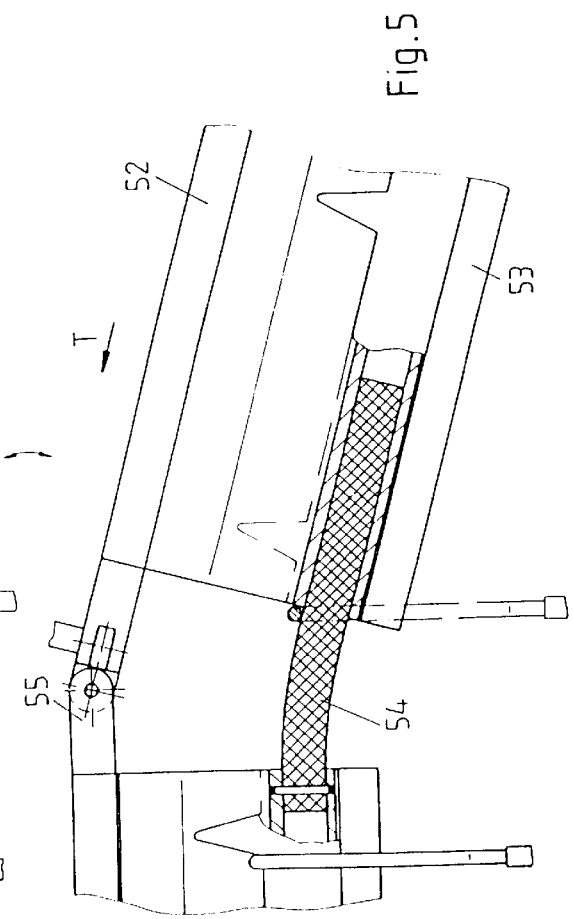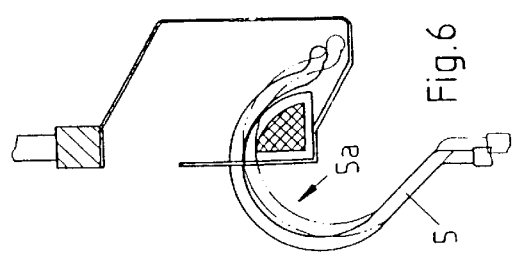

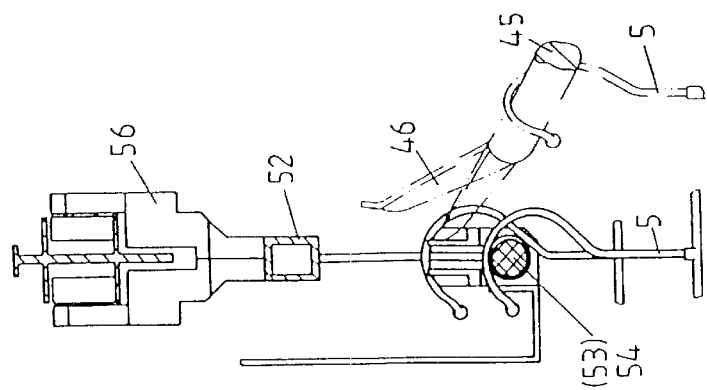
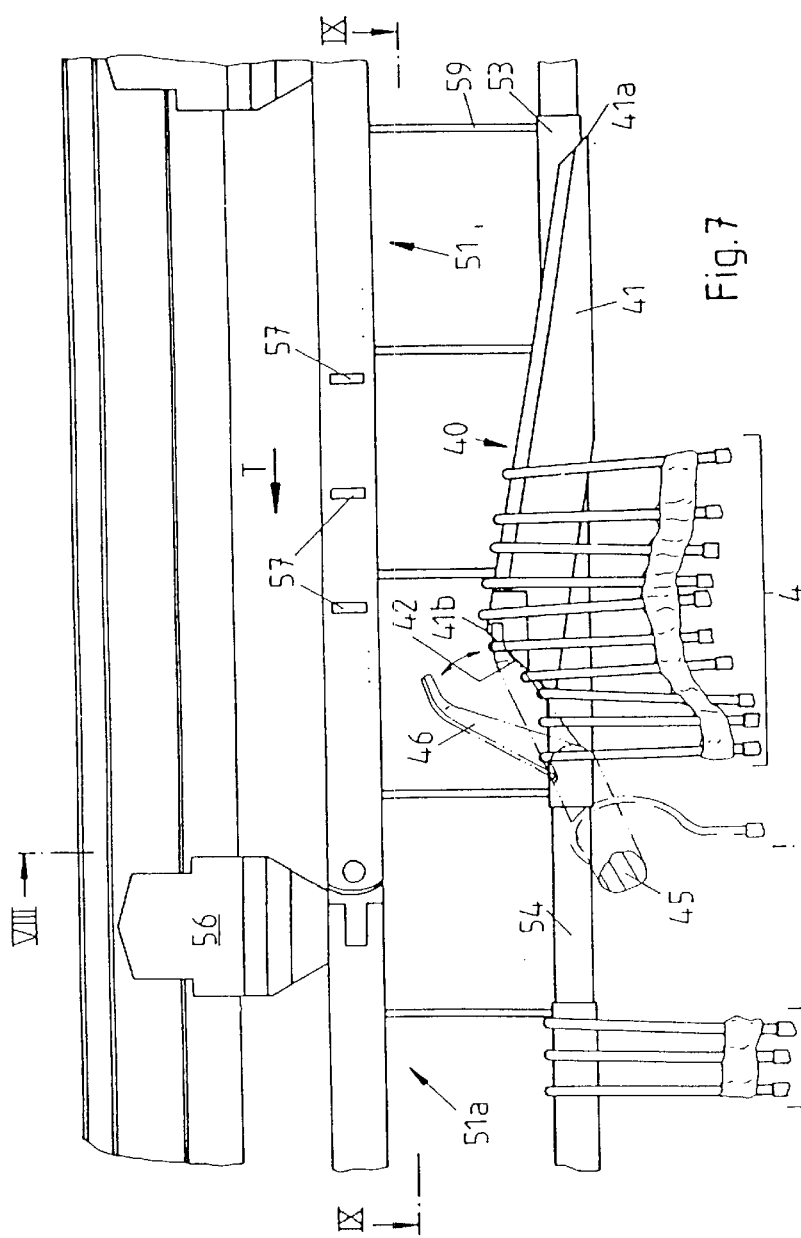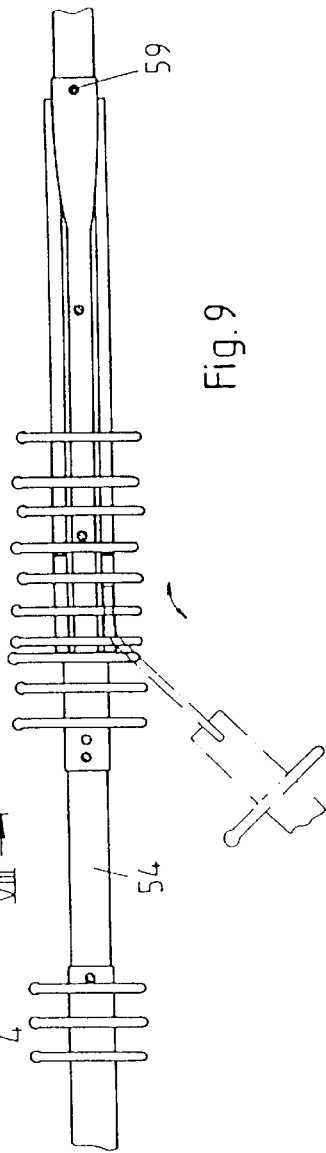

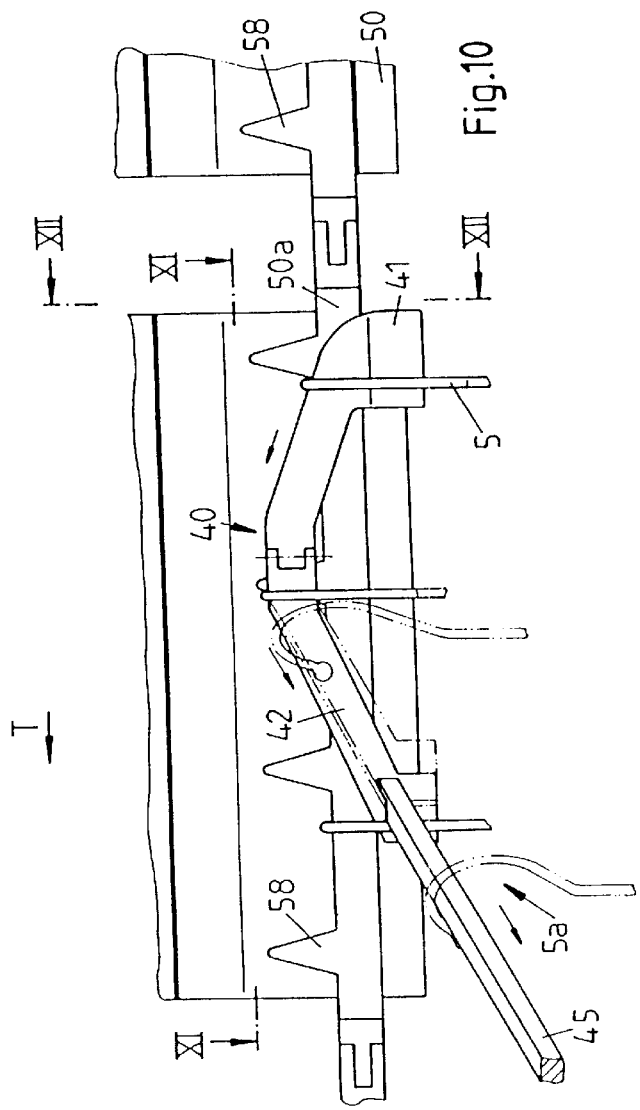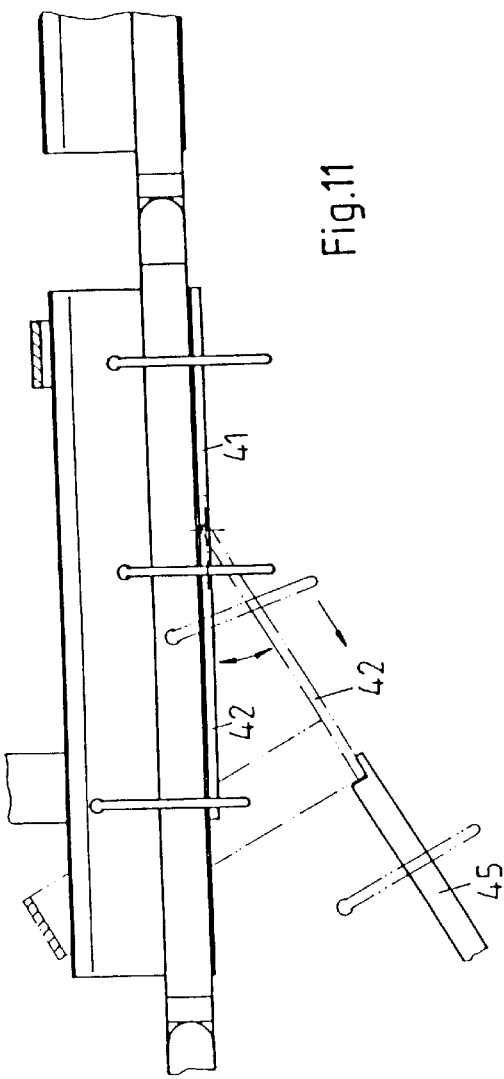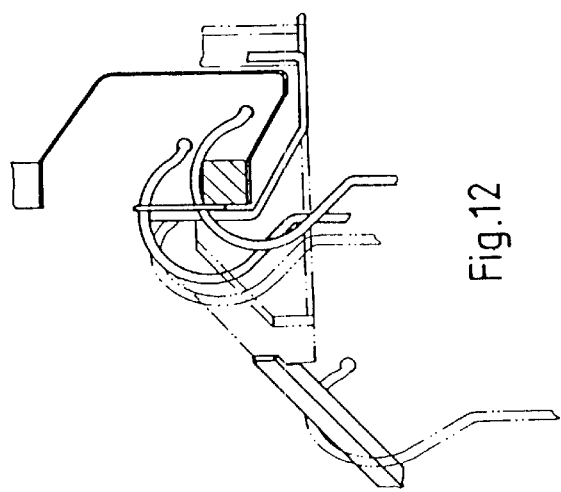

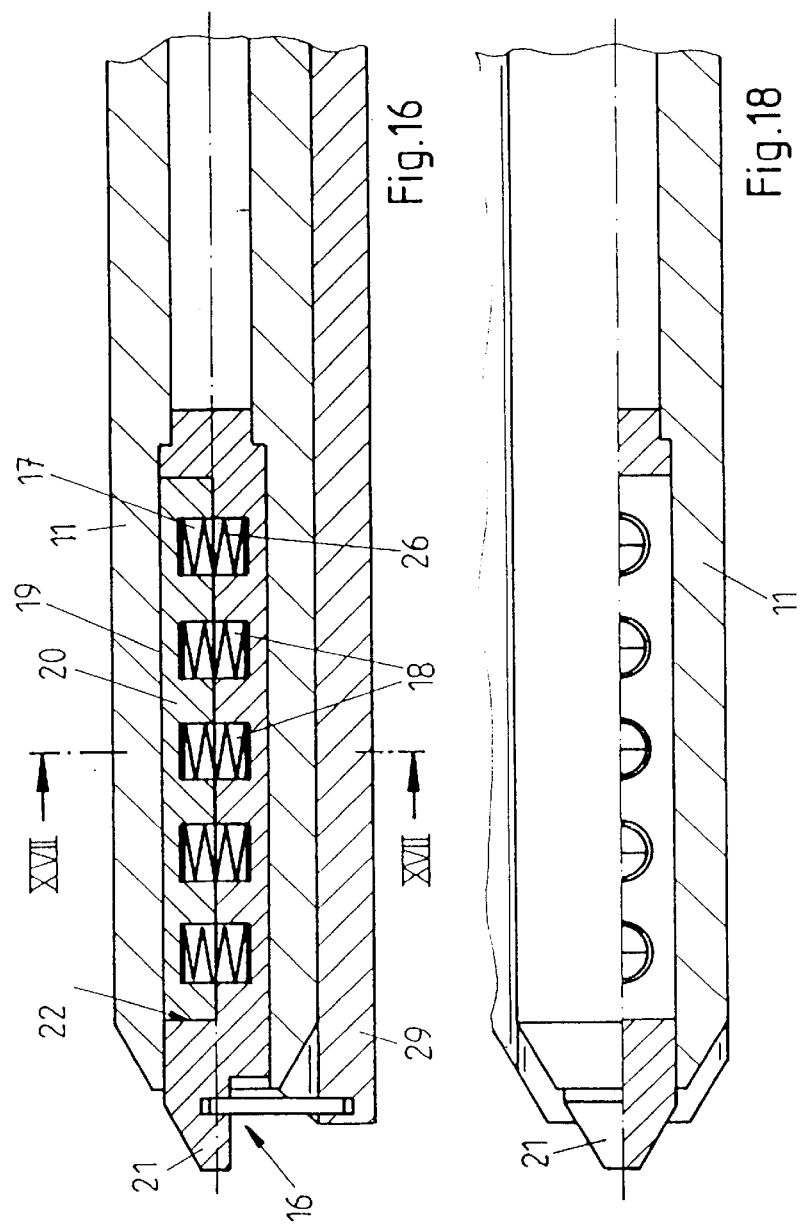

METHOD OF CONVEYING ARTICLES HANGING ON HANGERS AND DEVICES FOR USE IN THE METHOD

BACKGROUND OF THE INVENTION

1. Field of the Invention

The present invention relates to a method of conveying articles hanging on hangers, in particular articles of clothing, in which the article is transported from a loading region into a conveyance region and from there into a delivery region, as well as devices for use in the method.

2. Description of the Related Art

U.S. Pat. No. 4,909,373 discloses a method for conveying articles of clothing or the like. The articles are held on hanger hooks suspended in individual conveyor pockets during transportation. The hanger hooks are ejected from the conveyor pockets at switching-out locations and slide along a slide rod into a delivery region. The capacity of a hanging conveyor system operated in this manner is limited in that only one clothes hanger hook can be hung in each conveyor pocket. Consequently, an increase in conveying capacity is possible only by increasing the speed of transport and/or by reducing the distance between the individual conveyor pockets.

Conveyor systems are also known in which the conveyor carriers are so-called trolleys that travel along a rail. Each trolley can receive several clothes hangers. These trolleys are designed to receive a maximum capacity of hangers. Even if substantially fewer articles are transported than the maximum number for which the trolleys are designed, an unnecessarily long conveyor path is required, and the time of transport, from the switching of the conveyed article into the conveyance region until the transfer out into the delivery region, is correspondingly long. As a result, the capacity of such a conveyor system is also limited. Furthermore, trolley conveyor systems are rather expensive to construct.

For individualizing of conveyed material hanging on hangers provided with hanger hooks, there is known from Federal Republic of Germany OS 42 44 219 a horizontally arranged, rotatably driven spindle. The spindle has varying pitch providing grooves of different widths in which the hanger hooks are transported. In this way, it is possible to move the hangers, gripped in each case by the spindle, rapidly away from the stowage length. Accordingly, the small spacing between the individual hanger hooks originally present in the region of the stowage length is correspondingly increased, and the desired individualizing can be obtained. This known individualizing device cannot be used unconditionally when clothes hangers having hooks of wire of different diameter are used.

For switching of hangers provided with hanger hooks into the delivery region of a hanging conveyor system, a prior art device is known in connection with which the material being conveyed is fed continuously and possibly stowed in a loading region and switched-in in a controlled manner. For stowing, a first driven spindle having a flat pitch is provided. For the switching-in, a second driven spindle of larger pitch extending coaxially thereto are provided. The two spindles are to be driven by separate electric motors, in which connection the motors must be synchronized with respect to each other, which, in addition to the structural expense resulting from two motors, also further increases the expense for control.

Proceeding from these problems, an improved method of conveying is needed such that the capacity of the conveyor is substantially increased with at least the same degree of safety, and the structural expense of the conveyor system is reduced.

SUMMARY OF THE INVENTION

The present invention overcomes the limitations of the prior art, such as those described above, by providing a method of conveying that includes the following steps:

a) forming grip units by combining several individual conveyed materials into groups of the same or different size and establishing a theoretical maximum length for a grip unit;

b) counting a clock pulse produced in the conveyance region;

c) stowing the grip units in a loading region;

d) individualizing the grip units in order to form well-defined distances between them and feeding the individualized grip unit to a position in front of the conveyance region;

e) testing whether a sufficiently large gap exists in the conveyance region for the switching-out of the grip unit which has been moved up to in front of the conveyance region, based on the maximum length established and the counting of the clock pulses for the determination of the length of the gap;

f) switching the grip unit into the next sufficiently large gap in the conveyance region;

g) establishing the distance to be moved by the grip unit in the conveyance region;

h) tracking the distance moved of each grip unit switched into the conveyance region by continuous counting of the clock pulses; and i) switching the grip unit out to the delivery region when the counting of the clock pulses shows that the distance established has been travelled, in the manner that the switching-out place is closed and remains closed as a function of the length of the grip unit switched out.

By combining the articles into grip units, it is possible, for example, to transport together articles assigned to a particular delivery place, in which connection the grip units may be of different size so that the space required by them in the conveyor can be utilized optimally. A grip unit can be assembled in any desired order. Further, grip units can be grouped according to various criteria, as follows: customer-related; conveyor-material related; types of clothing articles; articles of clothing of a given size, color, or the like; or they can also be assembled for a given person; or by size of the grip units, such that they can be gripped and carried as a single unit by the operator, insofar as further manual work follows the delivery region.

For forming the grip units, the individual hanger hooks are combined and held together, for instance by adhesive tape. When the grip unit is switched out or arrives at the final consumer, the grip units can simply be cut open.

Individual conveyed articles can also be transported in the conveyor, between grip units, for example. Well-defined distances are maintained between the grip units, and it is established how far the grip unit or the correspondingly treated individual conveyed article must be transported in the conveyance region.

In order to produce a clock pulse in the conveyance region, regularly recurring points in the revolving conveyor are detected. Consequently, for example, individual elements of an endlessly composed conveyor strand are marked so that they can be recognized by a light barrier or the like.

The closer the distance between the regularly recurring points to be detected, the more precise can be the tracking of the distance and the adjustment of the specific distance between the grip units.

By the regular clock pulse produced in the conveyor system itself, the length of a conveyance distance can be defined by a given number of clock pulses. The number is dependent on the distance between the individual recurring fixed points which are detected at the measurement point. In this way, the tracking of the path is assured for each individual grip unit.

The distance between a loading point and a delivery point is determined, as explained, by the number of given clock pulses. Given that it is known where a grip unit that has been switched in is to be switched out from the conveyance region again, it is only necessary to count the number of clock pulses that are produced while the grip unit is transported. If the number of clock pulses established is reached, the corresponding switching-out point is closed for the switching-out of the grip unit. The switching-out point remains closed until the grip unit has completely passed the switching-out place. The switching-out point then opens immediately, such that subsequent grip units or individual parts can pass the switch-out place in order to arrive at another switch-out place intended for their transport from the conveyance region into the delivery region.

The lengthwise measurement of the grip unit can be effected directly at the switch-out point by means of a light barrier. It is also possible to determine the length of the grip unit upon the delivery into the conveyance region as a function of the clock pulses generated. Accordingly, the switch-out point can be kept closed sufficiently long by counting clock pulses.

It is advantageous for each grip unit to be coded and for the code to be read in the conveyance region for the purpose of assigning the switch-out goal. In this way, the conveyor system can be further automated.

In order to accelerate the switching-out process itself, it is particularly advantageous if, in principle, the grip units are lifted out of the conveyor carrier at each switch-out point regardless of whether they are to be switched out at that point or not. Grip units which are not to be switched out are returned into the conveyor carrier beyond the switch-out point.

By this measure, each grip unit is conditioned optimally for the switch-out process. Switches can then be switched in a simple manner in or out at the switch-out point. Switching is independent of the conveyor carrier because no form-locked connection exists between the article conveyed and the conveyor carrier. Accordingly, the switch-out process is accelerated. The switch-out process also takes place substantially more dependably because the critical behavior of a hanger hook upon the lifting out of the conveyor carrier is independent of the switch.

A conveyor carrier for use in the method of the present invention preferably has a plurality of individual conveyor elements consisting of two vertically spaced strands. The upper strands are connected to each other in each case by articulated joint couplings (Federal Republic of Germany Patent 40 03 431). The carrier has lower strands formed with a hollow profile. Adjacent conveyor elements can be connected via flexible pieces which are mounted fixed in the profile of one conveyor element and loose in the profile of the adjacent conveyor element.

By this development, the conveyor strand, and thus the conveyor system, are made articulatable in three dimensions. The grip units, therefore, can be transported over several planes. Upon travel over a place of rise, the lower strand of the conveyor carriers must lengthen upon transition from the horizontal plane into a plane lying above it if the conveyor strand is to be endless. Due to the fact that the pieces are mounted loosely in the one hollow profile, they can be pulled out of the hollow profile by the necessary length. Similarly, the pieces can be pushed into the hollow profile in a corresponding manner upon transition from a horizontal upper plane into a lower plane. The flexibility of the pieces provides assurance that even sharp curves can be negotiated.

According to another aspect of the present invention, an individualizing apparatus is provided whereby the flexibility of the hanging conveyor system is increased, and thus the degree of universality of the method of the invention. The width of the smallest groove of the individualizing apparatus corresponds to the diameter of the wire of the smallest hanger hook to be transported. As a result, the cost is reduced of the structural expense of the hanging conveyor system which is necessary when hanger hooks of different diameters are used, particularly when the articles are combined in a single grip unit.

By this development of the individualizing device according to the present invention, there is definite assurance that the smallest hanger hook will be dependably grasped and transported forward over the spindle so as to move the grip unit rapidly away from the stowage place. By progressive widening of the grooves, the grip unit is pulled forward. The hangers present at the end of a grip unit can in this connection be pulled away over the smaller grooves so that the speed of passage of the spindle is no longer directly dependent on the width of the smallest groove, but rather on the number of hanger hooks that already are present in the wider grooves, in other words, in the region of the larger spindle pitch.

It is particularly advantageous if the grooves formed by the different pitch are so graduated in their width that a correspondingly wide groove is provided for every hanger hook of different wire diameter transported. In that way, the reliability of the individualizing device is increased.

In order to improve the switching of the conveyed article into the conveyance region which is necessarily inherent in the method of the present invention, and to simplify the construction of the known device, it is furthermore proposed, in accordance with a preferred embodiment of the present invention, that in a device for switching-in of this type, the two spindles be driven by the same motor. Accordingly, the first spindle is developed as a hollow shaft through which the drive shaft of the second spindle is passed, so that the one spindle is connected directly with the motor for the continuous drive and the other spindle is connected via a switchable clutch with the motor for the controlled drive.

The continuously driven spindle serves for the stowing of the hangers. As long as the second spindle which extends coaxially thereto is not rotating, the conveyed article is stowed at the transition place of the two spindles. By the connecting of the second spindle via the clutch, the stowed grip units can be pulled up in the desired number on the spindle and transported up to the transfer place into the conveyance region. By disconnecting the spindle, it is now possible for the grip unit to remain in a waiting position before delivery into the conveyance region until a sufficiently wide gap is present in the conveyance region. The spindle is then connected again via the clutch and the grip unit is switched in. In this connection, it is also possible to feed a plurality of grip units one behind the other. The distance between the grip units can be regulated by disconnecting the spindle for a given period of time.

Alternatively, it is also possible to drive the spindle intended for the stowing in a clocked manner, and to drive the spindle for individualizing continuously. When the stowing spindle is stopped, the individualizing spindle is not fed any conveyed material. In this case, however, the fact must be tolerated that the conveyed material to be switched-in cannot be transported directly to the switch-in place in front of the conveyance region, but must still be conveyed before the switching-in over the length of the spindle. The control of the hanging conveyor system is to be designed accordingly.

In order to avoid coasting of the feed spindle after it has been separated from the motor by the clutch, the rear end of the second spindle is, in a preferred embodiment, supported in the hollow shaft of the first spindle and can be braked. In this way, assurance is had that the grip unit stops immediately when uncoupled. It is particularly advantageous for the second spindle to have a brake for this purpose at its front end.

For this purpose, the second spindle is hollow at its front end and receives the two-part cylindrical brake therein, in which connection the one part acts continuously as a brake element on the cylindrical inner surface of the spindle. The other part is fastened outside the spindle, and the brake element is received in a recess in the other part which is adapted to the shape thereof, at least one compression spring being arranged between the two parts.

The two parts of the brake preferably are provided with several corresponding holes which lie opposite each other in the assembled condition of the brake in each of which a compression spring is arranged.

In order that the grip units can be lifted up at each switch-out point, regardless of whether they are actually to be switched out or not, a device for the switching-out of the hanger hooks from the delivery region onto a slide rod or the like furthermore is developed in accordance with the present invention. A two-part switch arranged parallel to the revolving conveyor strand is provided with a first piece which rises in the direction of transport and lifts the hanger hooks off the conveyor element. A second piece, which is fastened in a horizontally-swingable manner to the rear end of the first piece, descends in the transport direction, and conducts the unswitched hanger hooks back to the conveyor element. The switch is then arranged alongside the conveyor elements which pass by such that with the initial region of the switch, the hanger hook can be gripped in the closed curved part thereof, and the piece can be swung out of the direction of transport for connection with the slide rod or the like.

As on a ramp, the individual hanger hooks of the grip units are lifted at each switch-out point from the conveyor carrier and brought on the switch, the grip units being advanced over the conveyor carrier. If the grip unit is not to be switched out, then the hanger hooks slide back again into the conveyor carrier over the rear part (second piece). On the other hand, if the grip unit is to be switched out, the rear part swings laterally outward and—for the closing of the switch-out point—connects the switch with a slide rod. The hanger hooks then slide on the slide rod into the delivery region.

In a further embodiment of the switch-out device, a switch that is arranged parallel to the revolving conveyor strand is provided with a first piece rising in the transport direction which lifts the hanger hooks off of the conveyor element. A second piece adjoining same and descending in the transport direction returns the hanger hooks to the conveyor element. Furthermore, a hanger pivotally fastened to the slide rod or the like, and swingable on or at the first piece, is provided in order to produce a connection between the switch and the slide rod or the like. The switch is arranged alongside the passing conveyor element such that, with the switch's initial region, the hanger hook can be gripped in its closed curved part.

Other features and advantages of the present invention will become apparent from the following description of the invention which refers to the accompanying drawings.

BRIEF DESCRIPTION OF THE DRAWINGS

The invention will be explained in further detail below with reference to drawings and with the aid of several embodiments. In the drawings:

FIG. 3 is a partial showing of a conveyor system, in side view, according to a preferred embodiment of the present invention;

FIGS. 3a and 3b show details of the conveyor carrier on a larger scale, according to a preferred embodiment of the present invention;

FIG. 4 shows two adjacent conveyor elements, in a horizontal conveyance path, according to a preferred embodiment of the present invention;

FIG. 5 shows two adjacent conveyor elements upon transition from an ascending path into a horizontal conveyor plane, according to a preferred embodiment of the present invention;

FIG. 6 is a cross section along the line VI—VI of FIG. 4, according to a preferred embodiment of the present invention;

FIG. 7 shows a switch for the switching of the grip units out of the conveyor path, seen in side view, according to a preferred embodiment of the present invention;

FIG. 8 is a cross section along the line VIII—VIII of FIG. 7, according to a preferred embodiment of the present invention;

FIG. 9 is a top view of the switch of FIG. 7;

FIG. 10 illustrates an alternative embodiment of a switch for the switching-out of the grip units;

FIG. 11 is a top view of the switch of FIG. 10;

FIG. 12 is a section along the line XII—XII of FIG. 10;

FIG. 16 shows the brake, in cross section, according to a preferred embodiment of the present invention;

FIG. 17 is a cross section along the line XVII—XVII of FIG. 16;

FIG. 18 is a top view of the brake of FIG. 16, seen partially in cross section.

DETAILED DESCRIPTION OF THE PREFERRED EMBODIMENTS

Figure 1:
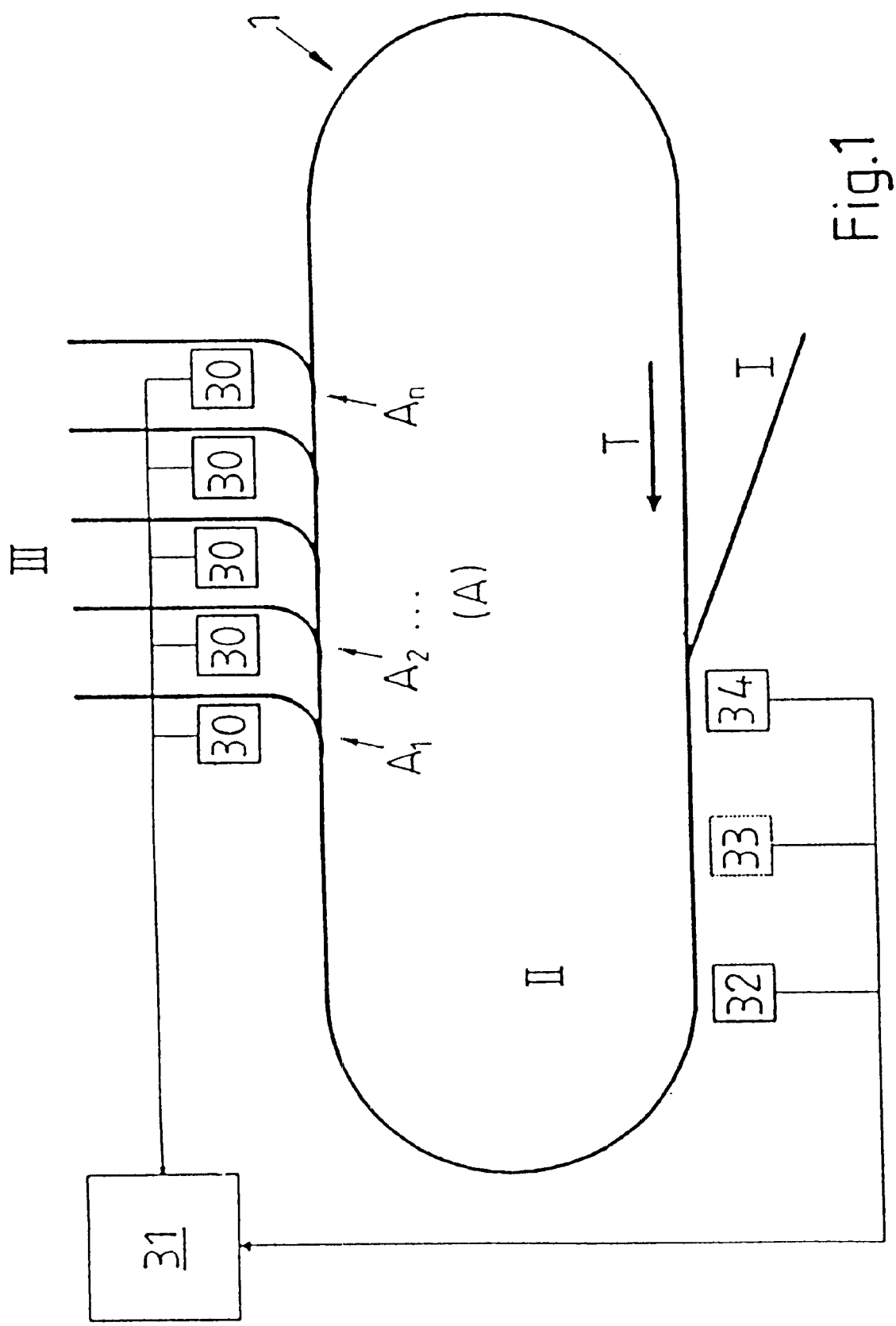
FIG. 1 is a diagrammatic top view of a hanging conveyor system, according to a preferred embodiment of the present invention.

FIG. 1 shows a basic sketch of a hanging conveyor system 1. From the loading region I the conveyed material is switched into the conveyance region II and transported from there into a delivery region III. A number of switch-out points A, namely $A_1, A_2, \ldots, A_n$ lead to delivery region III. Each switch-out point $A_1, A_2, \ldots, A_n$ is connected to a delivery control 30 which, among other things, controls the opening time of a switch 40 (FIGS. 7, 10), as will be explained in further detail below. The individual delivery controls 30 are connected to a central control unit 31 by which the entire course of the process is coordinated. A device 32 for measuring the length of the conveyed articles present in the conveyance region II, and particularly of grip units 4 (FIG. 3), is arranged parallel to the conveyor strand and is also connected to the central control unit 31.

Furthermore, parallel to the conveyor path of the hanging conveyor system 1, there can be an identification device 33 by which correspondingly coded conveyed material is identified such that it is switched out of the conveyance region at the proper switch-out point A. A clock-pulse generating device 34 also is connected to central control unit 31. The conveyed material is tracked along its path by clock-pulse generating device 30, and the switching-out thus is controlled.

Figure 2:
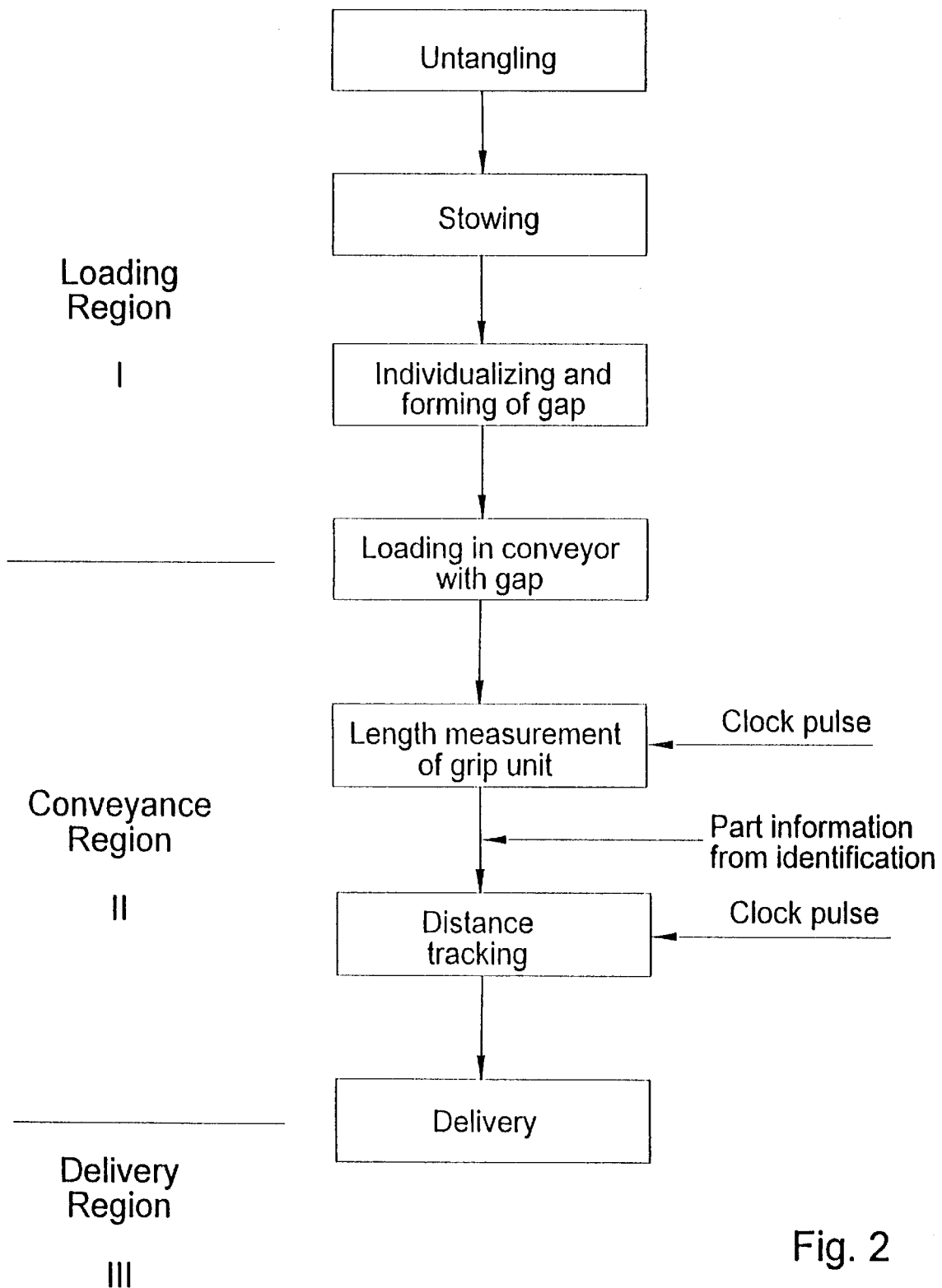
FIG. 2 is a block diagram of the course of the conveyor, according to a preferred embodiment of the present invention.

Referring to FIG. 3, individual conveyed articles 4', as well as groups of individual conveyed articles 4' that are combined into grip units 4, can be conveyed mixed together in the conveyor system. As shown by the flow sheet of FIG. 2, the hanger hooks 5 that are fed to the loading region I are first untangled as required. It is important in this connection that at least the hooks 5 (FIG. 6) of an individual conveyed material 4' be untangled. Crossed hanger hooks 5 within a grip unit are relatively uncritical. An untangling device such as described in Federal Republic of Germany 195 14 604.2 can reliably untangle both individual hanger hooks 5 and grip units 4. After the untangling, the conveyed articles 4, 4' are stowed in the loading region I. After the stowing, the conveyed articles 4, 4' are individualized and a gap formed between them. This is followed by the transporting of the conveyed articles 4, 4' to directly in front of the conveyance region II having an endlessly revolving conveyor strand. If a sufficiently large gap is present in the conveyor strand of the hanging conveyor system 1, the conveyed article 4, 4', which is waiting directly in front of the conveyor strand, is introduced into the conveyance region II.

Within the conveyance region II a clock pulse, used as a measure for length dimensions which are related to the conveyor system 1, is produced by clock pulse generator 34. For this purpose, the individual conveyor carriers are provided, for instance, with equidistant markings 57 (FIG. 7) which can be recognized via a light barrier (not shown) in the clock-pulse generator 34. The length of the conveyance path accordingly is defined by a given number of clock pulses; this number depends on the distance between individual markings 57. Similarly, the distance between the loading region I at the loading point and the delivery region III at the switch-out point A is related to a given number of clock pulses to be counted.

The clock pulses are generated by the revolving conveyor elements 50, 50a; 51, 51a (FIGS. 4, 10) and are, accordingly, completely independent of the speed of conveyance. Via the length-measuring device 32, the length can be determined by counting the clock pulses which are produced as long as a grip unit 4 or an individual conveyed article 4' passes the device 32. Via the part information from the identification device 33 with regard to the articles conveyed 4, 4', it can be determined in the central control unit 31 at what switch-out point $A_1, A_2, \ldots A_n$ the switching-out is to take place. The time at which the material conveyed 4, 4' has passed a measurement point (measuring device 32) is fixed. The distance from this measurement point to the switch-out point A is also fixed. By current counting of the clock pulse produced, it can be determined in the central control unit 31 when the material conveyed 4, 4' arrives at its intended delivery point A.

By activation of the delivery control 30, the switch-out point is opened so that the material conveyed is switched-out into the delivery region III. In this connection, the switch-out point remains closed precisely in correspondence with the length of the conveyed material 4, 4' which is to be switched out. For this purpose, the length detected in the length-measuring device 32 can advantageously be used. However, a light barrier or the like can also be provided at the switch-out point, it being connected with the central control unit 31 and recognizing when the rear end of the conveyed material 4, 4' has passed the switch-out point.

The endlessly revolving conveyor strand of the conveyance region II is formed by conveyor elements 50, 50a (FIG. 10) and 51, 51a (FIG. 4). The conveyor elements 50, 50a; 51, 51a are of identical construction in each case and are preferably provided with a plurality of markings 57 which are equally spaced apart. The conveyor elements 51, 51a consist of the upper strand 52 and the lower strand 53. The upper strand 52 which bears the markings 57 furthermore bears the guide rollers 56 of the conveyor elements 51, 51a, with which the latter travel along a rail 60 which is suspended from the ceiling of the hall. In the upper strand 52, the conveyor elements 51, 51a are connected to each other by known articulated joint couplings 55. The connection in the lower strand 53 of the conveyor elements 50, 50a; 51, 51a is effected via a flexible piece 54 which preferably consists of a plastic (Vulkolan). The upper strand 52 is connected with the lower strand by vertical struts 59.

As shown in FIGS. 3a and 3b, the lower strand 63 is developed as a hollow profile. The flexible piece 54 has its one end firmly fixed in the hollow profile of the conveyor element 51, for instance glued, screwed or riveted therein, and its other end loosely inserted into the conveyor element 51a. The piece 54 can, accordingly, extend into the hollow profile of the conveyor element 51a or be pulled out of it again. Upon downward travel (FIG. 3a) the piece 54 is pulled out, while upon transfer from descent to a horizontal region (FIG. 3b) the piece 54 is pushed further into the lower strand 53 of the conveyor element 51a.

The lower strand 53 is provided with upward-pointing tooth-like drivers which serve reliably to push the hanger hooks resting on the lower strand 53 in the direction of transport T when ascending paths are moved over, particularly when—as will be explained below—the delivery point is passed. The drivers 58 can be replaced by the struts 59 or exist cumulatively to them.

Individualizing of the Hangers

Figure 19:
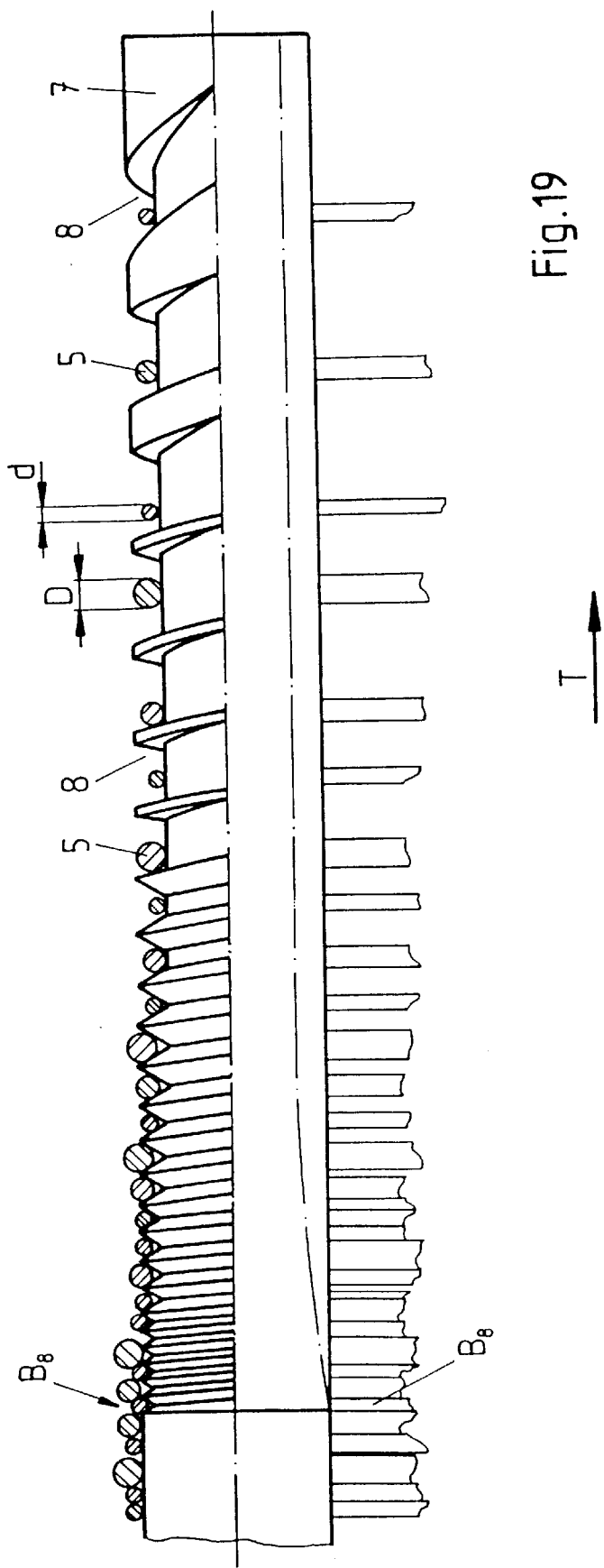
FIG. 19 shows an individualizing device for the grip units, according to a preferred embodiment of the present invention.

Referring to FIG. 19, for the individualizing of the hangers or hanger hooks 5, or of the material conveyed 4, 4', a spindle 7 driven in rotation is provided having a pitch which changes over its length so that grooves 8 of different width are formed in the transport direction T, by and in which grooves the hanger hooks 5 are transported. The width $B_8$ of the grooves 8 increases in the direction of transport. The smallest pitch and thus the smallest groove 8 is so wide that it corresponds to the smallest diameter d of a hanger hook 5 to be individualized. As shown in FIG. 19, the distance between the hanger hooks 5 accordingly increases with transport in the direction of transport T. Conveyed material 4, 4' which is combined into a grip unit 4 is transported rapidly by the front hanger hooks 5 so that the rear hanger hooks 5 of the grip unit 4 are pulled away over the grooves 8. The spindle 7 preferably is made of plastic.

Stowing and Individualizing

Figure 14:
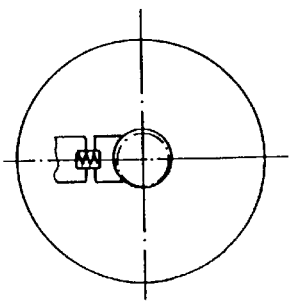
FIG. 14 is a view of the switching-in device of FIG. 13, seen in the direction of the arrow XIV.
Figure 13:
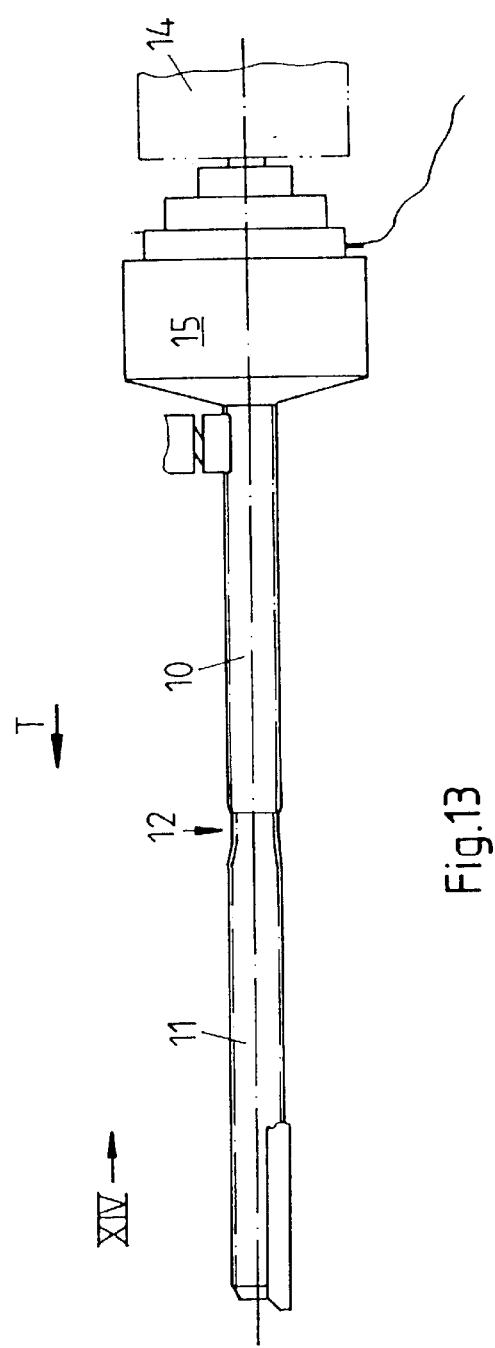
FIG. 13 shows the device for switching the grip units into the conveyance region, seen in side view, according to a preferred embodiment of the present invention.
Figure 15:
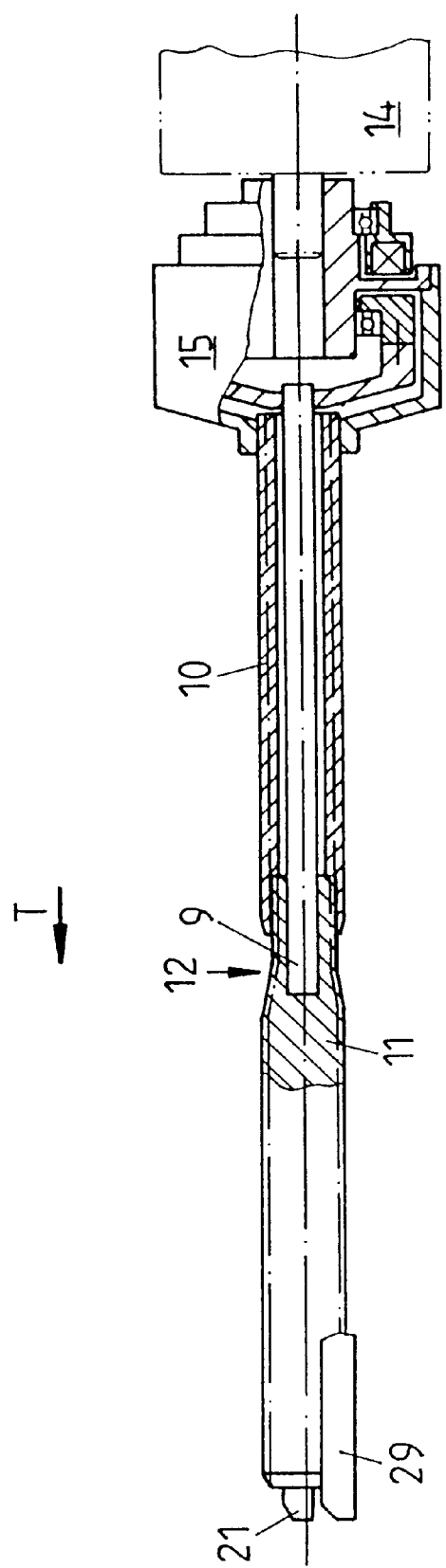
FIG. 15 shows the device of FIG. 13, partially in cross section.

Referring to FIGS. 13 to 15, for stowing and then individualizing, or formation of gaps, between the grip units 4, two spindles 10, 11 are arranged coaxially one behind the other. The front spindle 10 in the direction of transport T is provided with a smaller pitch, while the rear spindle 11 is provided with a larger pitch. The spindle 11 is preferably of a development similar to the spindle 7. The spindle 10 is developed as a hollow shaft and serves at the same time for the mounting of the spindle 11. The spindle 10 is directly connected to the motor 14. The spindle 11 is connected to the motor 14 via a clutch 15. For this purpose, a shaft 9 connected to the spindle 11 extends through the hollow shaft of the spindle 10 and terminates in clutch 15. By switching clutch 15, spindle 11 can be driven or stopped.

When spindle 11 is stationary and spindle 10 is turning, grip units 4 are stowed at the transfer point designated 12. For moving grip units 4 to the switch-in point, the spindle 11 is turned on and the front hanger hooks 5 pulled away from the stowage place 12. The front mounting point 29 of the spindle 11 is so developed that the hanger hooks 5 can at least in part slide over it. The end of the spindle 11 which is present in the bearing 29 terminates directly at the switch-in point.

In order that the individualized grip units 4 or individual conveyed material 4' can be switched in a specific manner into the conveyance region II, it is necessary that the spindle 11 can be stopped practically free of deceleration and does not continue rotating. For this purpose, a brake 16 (FIG. 16) is provided in the front end of the spindle 11. The front end of the spindle 11 as seen in the direction of transport T is drilled hollow in order to receive the brake 16.

The brake 16 consists essentially of the brake element 20, which acts continuously on the cylindrical inner surface 19 of the hollow drilled spindle 11 and the part 21 which also acts on the cylindrical inner surface 19 and is fastened outside the spindle 11 on the bearing 29. The two parts 20, 21 are provided with five holes 17, 18 lying one behind the other, which face each other when the brake is assembled. In each cylindrical chamber formed by the holes 17, 18, there rests a compression spring 26 via which the braking forces are applied. The brake elements 20, 21 which rest against this cylindrical inner surface 19 of the shaft 11 prevent the spindle from continuing to rotate after it has been disconnected.

Switching-Out

Returning to FIG. 7, at each switching-out or delivery point $A_1, A_2, \ldots, A_n$ there is a switch 40 which is so developed that the hanger hooks 5 of each conveyed material passing the switch-out point A are lifted out of the conveyor carrier 50, 50a; 51, 51a, regardless of whether or not the grip unit 4 or the individual conveyor material 4' is to be switched-out. For this purpose, the switch 40 is provided with a front piece 41 which ascends in the direction of transport T. Adjoining the piece 41 is a second piece 42 which descends in the direction of transport. The hanger hooks 5 lying on the conveyor elements 51, 51a are pushed by the struts 59 or the drivers 58 up on the first piece 41 to such an extent that the hooks are lifted-off of the strand 53. If the grip units 4, or the conveyed material 4', is not to be switched out, the hoop which is connected with the slide rod 45 and is swingable in a vertical direction is opened so that the hanger hooks slide along the second piece 42 again onto the lower strand 53 of the conveyor element 51, 51a. On the other hand, if it is desired that a grip unit 4 or an individual conveyed material 4' be switched out, the swingable hoop 46 is swung open or against the switch 40, via the delivery control 30, so that the hanger hooks 5 can slide onto the slide rod 45 in order to enter into the delivery region III.

As shown in FIGS. 10 and 11, the switch can also be developed in such a manner that the second piece 42 is swingable on the end 41b of the first piece 41 which ascends in the direction of transport T. As long as no delivery of the grip units 4 or of an individual conveyed material 4' is desired, the rear piece 42 remains swung parallel to the conveyor strand. The hanger hooks 5 are pushed up via the drivers 58 onto the first piece 41 so that they are lifted out of the conveyor element 50 and slide down on the second piece 42 into the conveyor element 50. By the swinging-out of the second piece 42 and connection with the slide rod 45, the grip units 4 can be switched out. After a grip unit 4 has been switched out, the piece 42 swings back again so that following grip units 4, insofar as they are not to be switched out, are conveyed back into the conveyor element 50. In a corresponding manner, in the embodiment of the switch described above with reference to FIG. 7, the swingable hoop 46 is opened.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A method of conveying material hanging on hangers, in particular articles of clothing, in which the material is transported from a loading region into a conveyance region, and from the conveyance region into a delivery region, the method comprising the steps of:

a) forming grip units by combining several individual materials into groups of the same or different size and establishing of a theoretical maximum length for a grip unit;

b) counting clock pulses produced in the conveyance region;

c) stowing the grip units in the loading region;

d) individualizing the grip units so as to form spaces between respective grip units and feeding the individualized grip units to a position in front of the conveyance region;

e) testing whether a sufficiently large gap is present in the conveyance region for switching a respective grip unit that has been fed to the position in front of the conveyance region, based on the maximum length established and the counting of the clock pulses for the determination of the length of the gap;

f) switching the grip unit into the next sufficiently large gap in the conveyance region;

g) establishing the distance to be moved by the grip unit in the conveyance region;

h) tracking a distance path of each grip unit switched into the conveyance region by continuous counting of the clock pulses; and i) switching the grip unit out into the delivery region when the clock-pulse counting shows that the distance established has been moved by the grip unit, such that the switching-out point is closed and remains closed as a function of the length of the grip unit.

2. A method according to claim 1, wherein each grip unit is coded and the code is read in the conveyance region for the assignment of the goal.

3. A method according to claim 1, wherein the length of the grip unit which has been switched-in is measured by counting the clock pulses while it passes a measurement point.

4. A method according to claim 1, wherein, by means of a sensor, it is determined whether the grip unit to be switched out has completely passed the switch-out point before it is opened.

5. A method according to claim 1, wherein the grip units are lifted out of the conveyor carrier at each switch-out point, regardless of whether or not the grip units are to be switched-out.

6. A method according to claim 1, wherein the grip units are switched into a closed rotating conveyor carrier.

7. A conveyor carrier for use in the method according to claim 1, having a plurality of individual conveyor elements consisting of two vertically spaced strands, the upper strands of the conveyor elements being connected together in each case via articulated joint couplings, wherein the lower strands have a hollow profile and adjacent conveyor elements are connected together via flexible pieces mounted fixed in the hollow profile of one conveyor element and loose in the hollow profile of an adjacent conveyor element.

8. A device for the switching-out of material conveyed hanging on hangers provided with hanger hooks from the conveyance region of a hanging conveyor system onto a slide rod, according to the method of claim 5, wherein a two-part switch which is arranged parallel to the rotating conveyor strand and has a first piece which ascends in the transport direction (T) and lifts the hanger hooks off of the conveyor element and a second piece descending in the direction of transport (T) and fastened swingably in horizontal direction to the rear end of the first piece, for returning the hanger hooks to the conveyor element, the switch being arranged to be close to the conveyor elements which pass it such that the hanger hook can be gripped in a closed curvature part by an initial region of the switch and the first piece can be swung out of the direction of transport (T) for connection with the slide rod.

9. A device for the switching-out of material conveyed hanging on hangers provided with hanger hooks from the conveyance region of a hanging conveyor system onto a slide rod according to the method of claim 5, wherein a switch which is arranged parallel to the rotating conveyor strand and has a first piece which ascends in the direction of transport (T) and lifts the hanger hooks off of the conveyor element and a second piece adjoining same which descends in the direction of transport (T) for returning the hanger hooks to the conveyor element, and a swingable hoop which is fastened in articulated manner to the slide rod, and is swingable on or against the first piece, in order to produce a connection between the switch and the slide rod, the switch being arranged with respect to the conveyor elements which pass along it that the closed curvature part of the hanger hook can be gripped by an initial region of the switch.

* * * * *